US007012925B2

(12) United States Patent
Benayoun et al.

(10) Patent No.: US 7,012,925 B2
(45) Date of Patent: Mar. 14, 2006

(54) SYSTEM FOR TRANSMITTING LOCAL AREA NETWORK (LAN) DATA FRAMES

(75) Inventors: Alain Benayoun, Cagnes sur Mer (FR); Patrick Michel, La Gaude (FR); Gilles Toubol, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 09/903,031

(22) Filed: Jul. 11, 2001

(65) Prior Publication Data

US 2002/0034185 A1    Mar. 21, 2002

(30) Foreign Application Priority Data

Aug. 9, 2000    (EP)    .................................. 00480075

(51) Int. Cl.
*H04L 12/28*    (2006.01)
(52) U.S. Cl. ...................................... 370/396; 370/401
(58) Field of Classification Search .................... None
See application file for complete search history.

(56) References Cited

U.S. PATENT DOCUMENTS 5,528,590 A * 6/1996 Iidaka et al. ........... 370/395.65
6,249,528 B1 * 6/2001 Kothary ..................... 370/466
6,266,333 B1 * 7/2001 Kartalopoulos ........ 370/395.53
6,661,788 B1 * 12/2003 Angle et al. ................. 370/390
6,721,324 B1 * 4/2004 Shinohara ................. 370/395.1
6,813,274 B1 * 11/2004 Suzuki et al. ............... 370/412
6,836,479 B1 * 12/2004 Sakamoto et al. .......... 370/389
6,882,649 B1 * 4/2005 Gura et al. ............. 370/395.42
6,907,001 B1 * 6/2005 Nakayama et al. ......... 370/230

* cited by examiner

*Primary Examiner*—Bob A. Phunkulh
(74) *Attorney, Agent, or Firm*—Scott W. Reid; Joscelyn G. Cockburn; Dillon & Yudell LLP (57) ABSTRACT

A data transmission system, which includes multiple local area networks (LANs) coupled by a hub via multiple LAN adapters and an ATM crossbar switch coupling all LAN adapters. At least a requesting LAN transmits LAN data frames to at least a destination LAN. The LAN data frames are converted into concatenated slots of the same size and transmitted through the ATM crossbar switch by the requesting LAN. The requesting LAN adapter includes a control logic for transmitting a plurality of request signals (REQ) to the ATM crossbar switch, each of them being associated with a destination LAN, and the ATM crossbar switch comprises a scheduler for transmitting grant signals (GNT) associated with the requests enabling the requesting LAN adapter to transmit LAN data frames to the destination LANs. The grant signals are transmitted by the destination LAN in an order depending upon a predetermined algorithm that controls the scheduler regardless of the order the requests are transmitted by the requesting LAN adapter.

23 Claims, 8 Drawing Sheets

SYSTEM FOR TRANSMITTING LOCAL AREA NETWORK (LAN) DATA FRAMES

BACKGROUND OF THE INVENTION

1. Technical Field

The present invention relates in general to the transmission of data frames between local area networks (LANs) and in particular to a system for transmitting LAN data frames through an asynchronous transfer mode (ATM) crossbar switch.

2. Description of the Related Art

Local area networks (LANs), such as ethernet or token-ring networks, are generally coupled via hubs. A hub is a system made of LAN adapters that communicate via a switch card. This switch card is implemented either as a parallel bus or a passive switch card, which further includes a matrix for achieving the connection between selected inputs and outputs.

Today, asynchronous transfer mode (ATM) technology is improving at a rapid rate. Most research developments in this field are concentrated in high-speed ATM networks instead of LANs. Extremely high speed ATM switches are now readily available and are utilized for transferring data between LANs coupled to the ATM switch. The utilization of the ATM technology for switching LAN frames requires a transformation of each LAN frame by splitting the LAN frame into ATM frames. This is accomplished by encapsulating each LAN frame in the ATM adaptation layer (AAL) format.

The LAN frame is transformed into ATM data packets in the AAL format via a special module. The LAN frame is then transferred to the switch card for switching. Such a requirement results in two major drawbacks. Since the frame is converted into ATM cells, a header in each cell including protocol information (e.g., destination address) is required. A second drawback is that the transformation of the LAN frame into ATM cells and the encapsulation in the AAL format requires important and costly hardware and software.

When a first LAN adapter requests transmission of a LAN frame to a second LAN adapter, the first LAN adapter sends a requests to the ATM switch and a scheduler determines whether or not satisfying this request is possible, while considering an algorithm that determines the best data coupling to establish at each time. Accordingly, the grant signal to this request may be delayed before being returned to the requesting LAN adapter, while other requests are still waiting to be processed in the second LAN adapter.

Consequently, it would be desirable for a system for exchanging data between multiple LANs without delaying requests between LANs.

SUMMARY OF THE INVENTION

To overcome the foregoing and additional limitations in the prior art, the present invention provides an improved data transmission system including multiple local area networks (LANs) coupled by a hub that further includes multiple LAN adapters coupled to the LANs. The present invention further includes an asynchronous transfer mode (ATM) crossbar switch coupling all LAN adapters.

At least one of the LANs requests transmission of LAN data frames to several destination LANs. The LAN data frames are converted into concatenated slots of an identical size and transmitted via the ATM crossbar switch. Each of these requests are associated with a destination LAN, and the ATM crossbar switch includes a scheduler for transmitting grant signals (GNT) associated respectively with the requests. This enables the requesting LAN adapter to transmit LAN data frames to the destination LANs. The grant signals are transmitted in an order that depends on a predetermined algorithm controlling the scheduler regardless of the order the requests are transmitted by the requesting LAN adapter.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
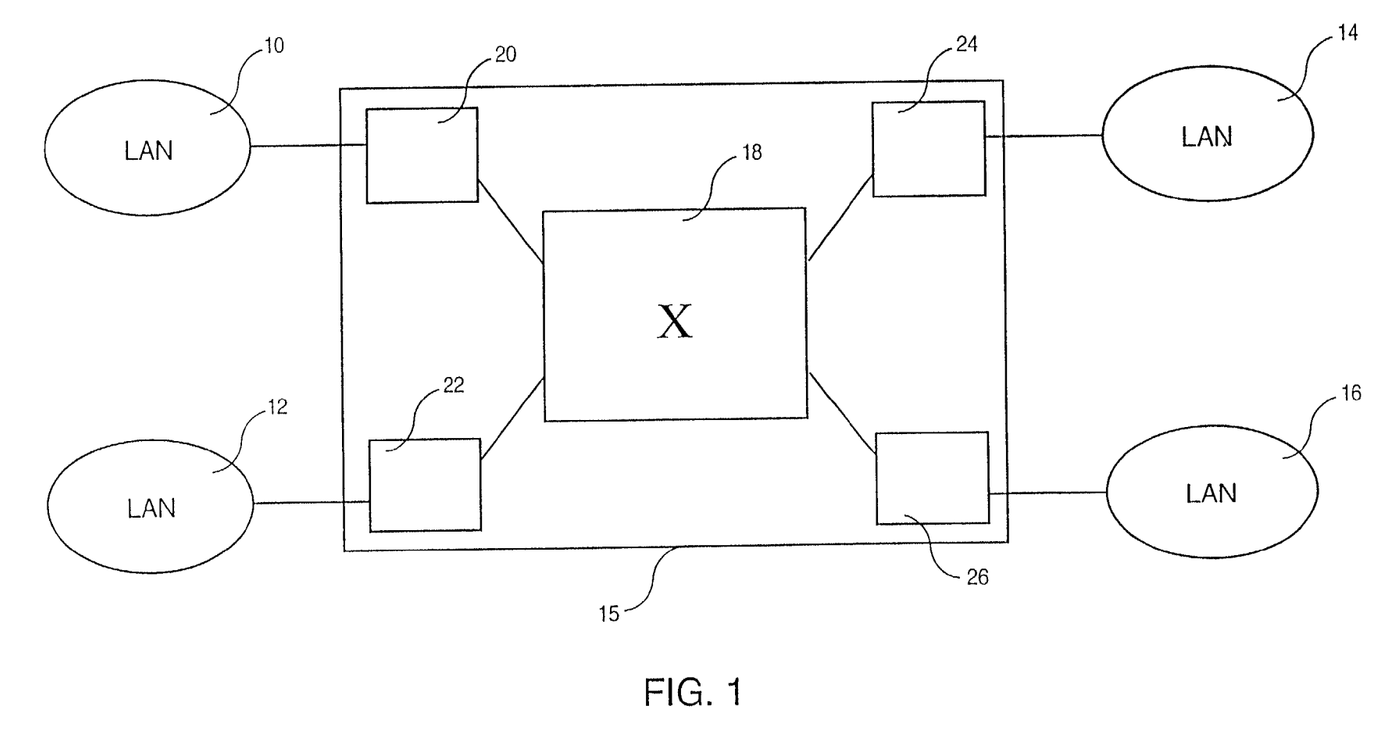
FIG. 1 illustrates a block diagram of an exemplary data transmission system including four local area networks (LANs) coupled by a hub according to a preferred embodiment of the present invention.

With reference to the figures, and in particular, with reference to FIG. 1, there is depicted a block diagram of a preferred embodiment of the present invention. Multiple local area networks (LAN) 10, 12, 14 and 16 are coupled by a hub 15, which includes an ATM crossbar switch 18 and multiple LAN adapters 20, 22, 24 and 26. LAN 10 is coupled to ATM crossbar switch 18 via LAN adapter 20, LAN 12 is coupled to switch 18 via LAN adapter 22, LAN 14 is coupled to ATM crossbar switch 18 via LAN adapter 24, and LAN 16 is coupled to switch 18 via LAN adapter 26.

Figure 2:
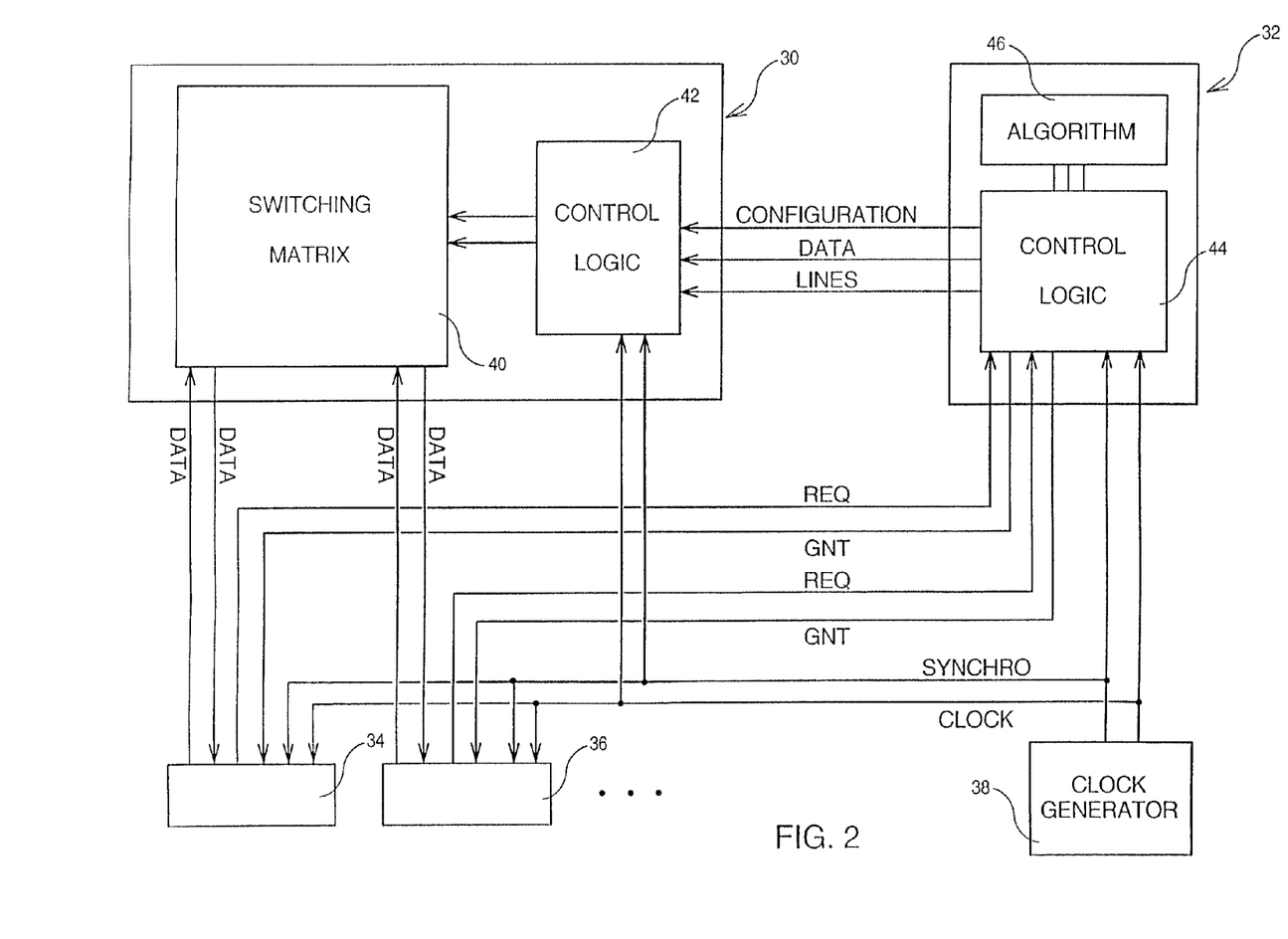
FIG. 2 depicts a block diagram of an asynchronous transfer mode (ATM) crossbar switch utilized within the hub according to a preferred embodiment of the present invention.

Referring to FIG. 2, an ATM crossbar switch utilized in the invention includes a data switch module 30, a scheduler 32, multiple LAN adapter connectors 34 and 36 coupling multiple LANs to ATM crossbar switch 18, and a clock generator 38 for supplying the clock and the synchronization to data switch module 30, scheduler 32, and to LAN adapter connectors 34 and 36.

Data switch module 30 includes a switching data block 40, which is generally implemented as a passive switching matrix between data input signals from the LAN adapters to the switching matrix and data output signals from the switching matrix to the LAN adapters. Data switch module

30 also includes a control logic 42, which decodes the configuration signals received from scheduler 32 to determine the data path connections and establishes the data path connection based on the synchronization signal received from clock generator 38.

Scheduler 32 also includes an algorithm unit 46 which determines the best data connection to establish each time a request is issued by a requesting LAN. Such a determination is based on the selection of the request amongst all requests received from the requesting LAN adapters that meets some predetermined criteria such as a priority order, the selection of unicast/multicast, the selection between reserved bandwidth data and non-reserved bandwidth data or any other criteria defined by the user.

A request signal (REQ) is issued by a requesting LAN adapter when the requesting LAN adapter has a LAN frame to transmit to a destination LAN adapter through the ATM crossbar switch. Such a request signal is a serially encoded signal during the first four bytes of a time slot and includes thirty-two bits, which are sampled by a signal sixteen times the data clock frequency. The first two bytes of the REQ signal includes the routing destination address on sixteen bits, one bit per LAN adapter, a bit being set when the destination address corresponds to the associated LAN adapter. This encoding scheme allows either a point-to-point connection, a multicast connection or a broadcast connection. The next two bytes of the REQ signal contains the connection time on sixteen bits, that is the number of time slots required to transmit the entire frame.

When receiving the grant signal (GNT) from control logic 44 of the scheduler, the requesting LAN adapter transmits its frame. The GNT signal generated by the control logic is a serially encoded signal during the first four bytes of a time slot and includes thirty-two bits, which are sampled by a signal sixteen times the data clock frequency. The first two bytes of the GNT signal includes the routing destination address on sixteen bits, one bit per LAN adapter, a bit being set when the destination address corresponds to a destination LAN adapter. As for the REQ signal, the next two bytes of the GNT signal includes the connection time on sixteen bits, or the number of slots utilized for transmitting the frame.

The GNT signal includes information that is identical to the information contained in the REQ signal because the GNT signal is entirely de-correlated from the corresponding REQ signal. This means that any LAN adapter can both send multiple requests and receive multiple de-correlated signals.

Figure 3:
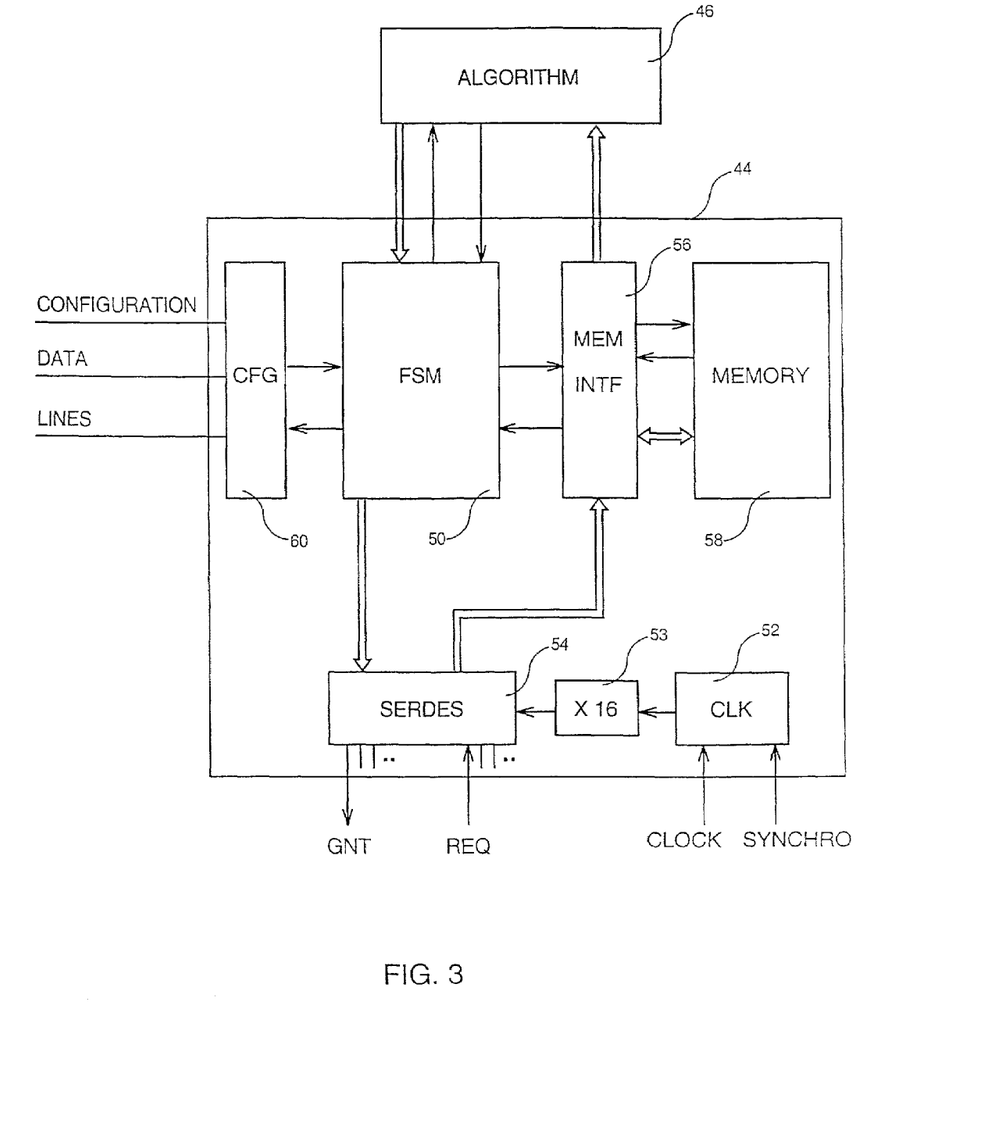
FIG. 3 illustrates a block diagram of the control logic of a scheduler according to a preferred embodiment of the present invention.

With reference to FIG. 3, there is illustrated a control logic 46 of scheduler 32 that includes functional units, which enable the requests from each adapter to be handled without delaying the requests due to a previous request that has yet to be processed. Control logic 46 includes a finite state machine FSM 50, which controls all steps performed from the reception of a request signal REQ to the transmission of a grant signal GNT. Note that the FSM 50 is timed by a clock control unit 52, which receives a clock signal and a SYNCHRO signal from the clock generator 38, as depicted in FIG. 2.

When a REQ is received from a LAN adapter, the REQ is deserialized by a serialized/deserializer SERDES 54, and transferred under control of FSM 50 to a memory interface 56. This REQ is stored into memory 58. Note that multiple REQs can be stored into memory 58 for each LAN adapter.

Periodically or as soon as a REQ is received from a LAN adapter, memory interface 56 provides algorithm 46 with the REQs stored into memory 58 for each LAN adapter. Algorithm unit 46 selects a REQ among multiple REQs for each LAN adapter and provides REQ confirmation to FSM 50.

Such a configuration is sent by FSM 50 to a configuration control block (CFG) 60 for transmission to the data switch module 30, as shown in FIG. 2, on the configuration data lines. At the same time, the selected REQs are transferred to serializer/deserializer 54 to be serialized and transmitted as grant signals GNT to the LAN adapters 34 and 36. For this, the frequency of clock signals issued from clock control unit 52 are multiplied by sixteen in multiplier 53 and the resulting signals are used by SERDES 54 for generating the thirty-two bits of the GNT signal. Note that FSM 50 also sends information signals to memory interface 56 to indicate which REQs have been selected by algorithm unit 46 and have to be removed from memory 58.

Figure 4A:
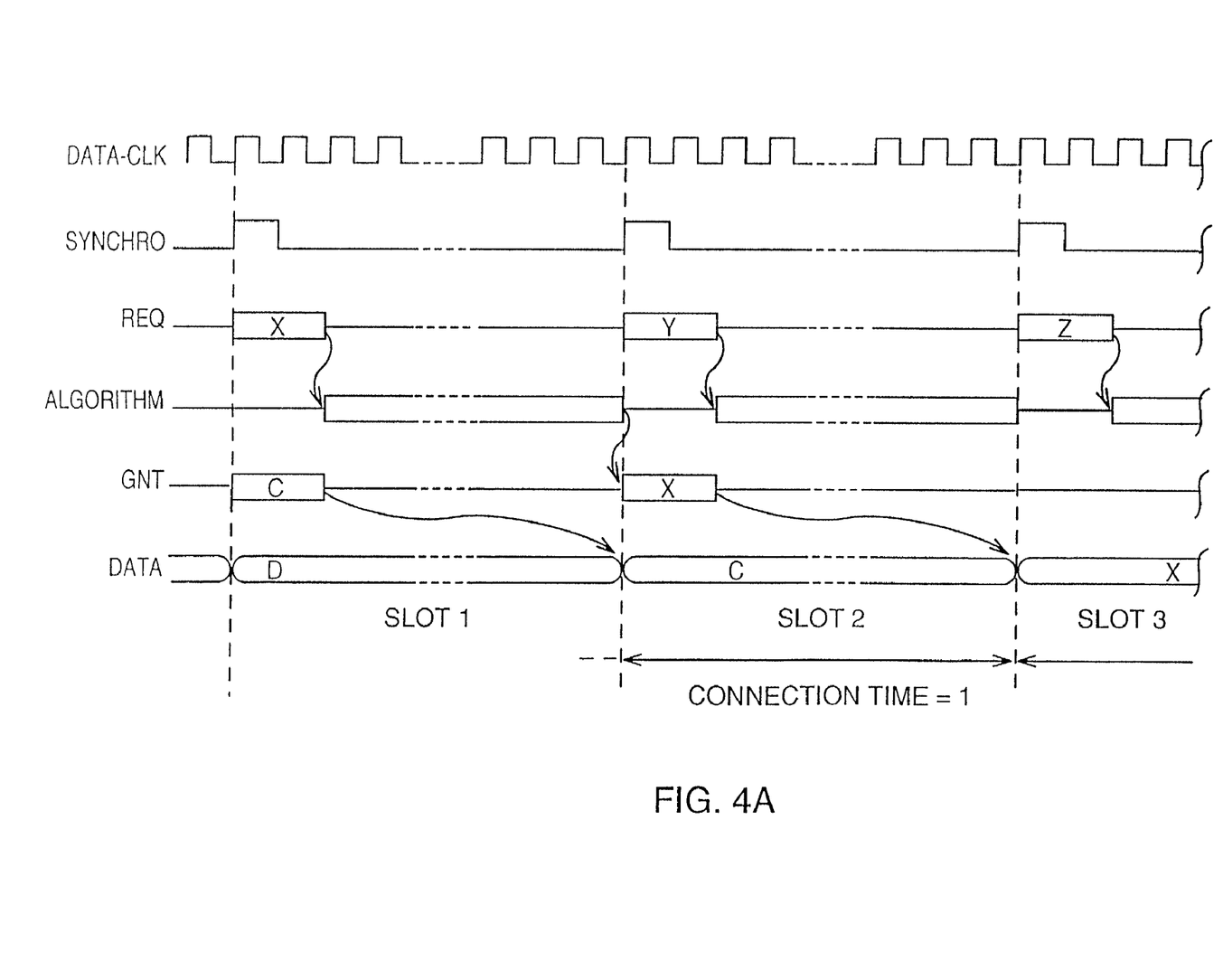
FIG. 4A and FIG. 4B depict diagrams illustrating the signals exchanged between the ATM crossbar switch depicted in FIG. 2 and the LAN adapters according to a preferred embodiment of the present invention.
Figure 4B:
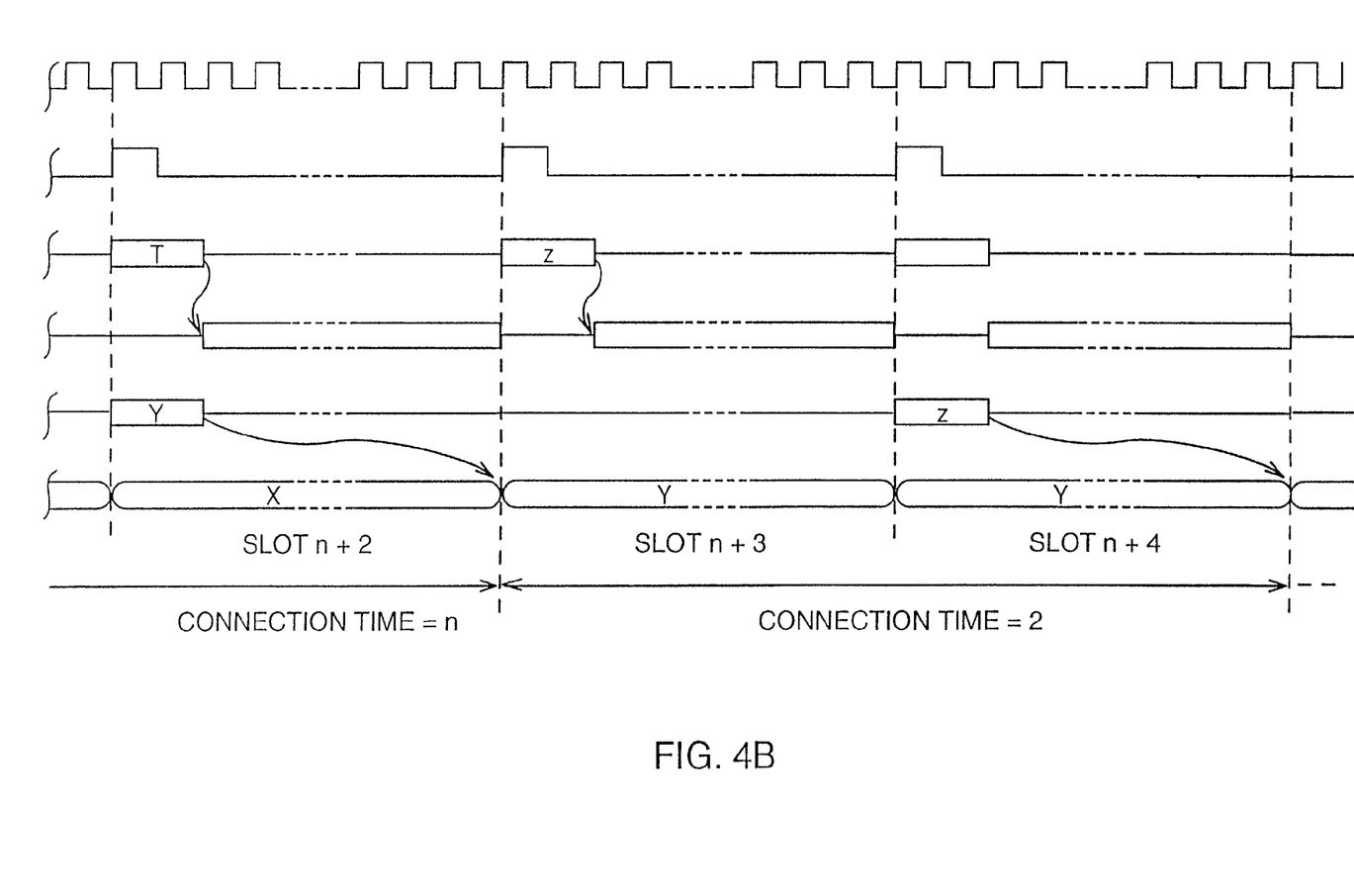

Referring now to FIG. 4A and FIG. 4B, the relationship between the signals at the interface between the ATM crossbar switch and LAN adapters is illustrated. First, the data clock pulses exchange the LAN frames between the adapters through the switch card. At least fifty-three clock pulses determine the time slot to exchange fifty-three data bytes, which correspond to the ATM cell size. It must be noted that there is no requirement on the clock rate.

The SYNCHRO signal is a one pulse clock during the first data byte of each time slot. The REQ signal is active during the first two data bytes of a time slot. Then, the algorithm process occurs during the following fifty-one bytes of the slot. Finally, a GNT signal delivered by the scheduler at the next time slot, is activated during the first two bytes of the following time slot. As previously mentioned the GNT signal corresponds to the selected configuration based on the algorithm processing.

Thus, as depicted in FIGS. 4A and 4B, a request X for transmitting n slots is received at the beginning of slot 1. At the same time a GNT signal is activated for a request C. Then, the request X is accepted by a GNT signal at the beginning of slot 2 during which data C are transmitted by the LAN adapter. At the beginning of the last slot (n+2) of the connection time during which the data X are transmitted by the LAN adapter, a REQ Y for two slots is accepted by a GNT signal. Then, the data corresponding to this GNT are transmitted by the LAN adapter during the two following slots, that is slots n+3 and n+4.

To summarize, at each synchronization pulse, control logic 44 stores all REQ configurations from each LAN adapter at each time slot. Then, algorithm 46 determines the best connection possible based on all stored REQ, sets the configuration data lines for switch module 30 and activates the GNT signal to the selected LAN adapters. This new matrix switching state is latched into switching matrix 40 on the falling edge of the GNT signal. This is performed by control logic 42 of switching module 30.

Figure 5:
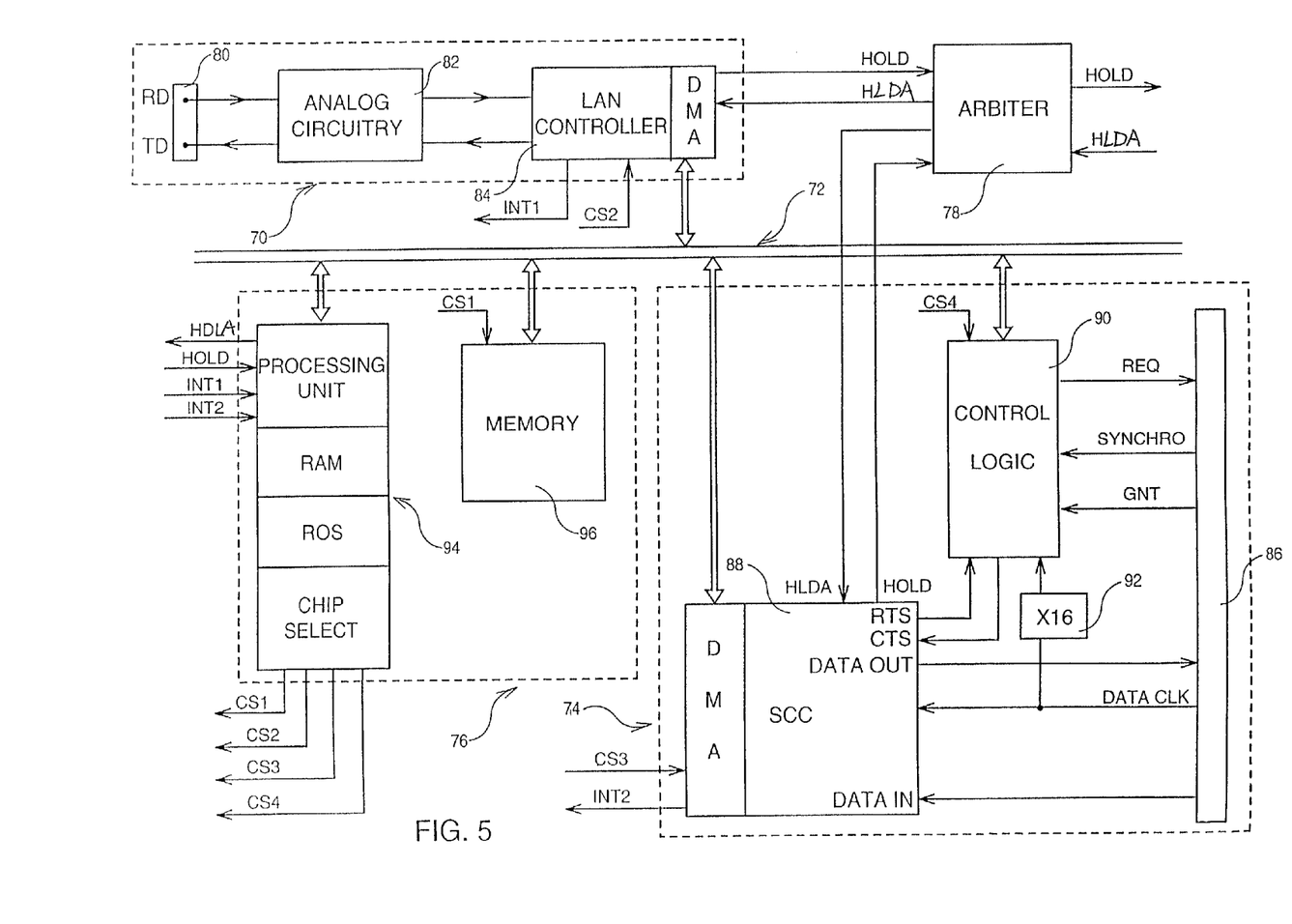
FIG. 5 illustrates a block diagram of a LAN adapter within the data transmission system according to a preferred embodiment of the present invention.

With reference to FIG. 5, the hardware architecture of a LAN adapter includes a LAN logic 70 for processing the exchange of data with the LAN, a general bus 72 for transferring data bytes, a switch logic 74 for processing the exchange of data with the switch card, a system bus logic 76 for processing the transfer of data in the LAN adapter and an arbiter 78 for taking care of any bus contention for the requests which may come from LAN controller 74 or serial communication controller (SCC) 88, as illustrated.

LAN logic 70 includes a LAN connector 80 that couples the LAN adapter to the LAN through a LAN attachment cable and carries the transmit data signal (TD) and the receive data signal (RD), an analog circuitry 82 for converting the TTL logic signals into analog or analog to TTL, and for providing specified network characteristics (e.g., impedance, capacitance, cross talk.) LAN logic 70 also includes a LAN controller 84 that, when receiving a frame from a LAN, synchronizes its internal receive clock circuitry during the seven preamble bytes, detects the LAN frame through the Start Frame Delimiter (SFD) byte, checks the data integrity of the frame by computing/comparing the four Frame Check Sequence (FCS) bytes, removes the protocol information such as preamble bytes, SFD byte and FCS bytes, and deserializes the remaining incoming bits to provide data bytes at the parallel interface with bus 72.

When transmitting data bytes from the parallel interface with bus 72 to the LAN, LAN controller 84 serializes the incoming parallel bytes, generates the protocol information bytes, and computes and sends the FCS bytes.

In a preferred embodiment of the present invention, the LAN controller 84 is a master device with an internal direct memory access (DMA) controlling the transfer of bytes on the parallel interface with bus 72.

Switch logic 74 includes a switch connector 86, a SCC 88 for transmitting serial data to the switch card through connector 86 and receiving data from the switch card through connector 86, a control logic 90 for generating the request signal and synchronizing the timing between the switch card and the LAN adapter, and a clock multiplier 92 for providing control logic 90 with the transmit clock generating the request signal at a frequency sixteen times the frequency of the data clock.

Connector 86 couples the LAN adapter to the switch card through a back plane and carries the request signal (REQ), the grant signal (GNT), the transmit data signal (DATA OUT), the receive data signal (DATA IN), the data clock signal (DATA CLK) and the synchronization signal (SYNCHRO).

When transmitting data bytes from the parallel interface to the switch card, the SCC 88 generates high-level data link control (HDLC) frames. The HDLC generation includes generating an HDLC flag (one byte) to start a frame, serializing and sending the incoming parallel data bytes, computing and sending the FCS (two bytes) after the data bytes, and generating an HDLC flag (one byte) to end the frame.

When receiving an HDLC frame from the switch card, SCC 88 detects the incoming frame through the flag, checks the data integrity of the frame by computing/comparing the Frame Check Sequence (FCS), and deserializes the incoming bits to provide data bytes at the parallel interface.

In a preferred embodiment of the present invention, the SCC 88 is a master device with an internal DMA controlling the transfer of bytes on the parallel interface.

System bus logic 76 includes a microcontroller 94 and a memory 96. Microcontroller 94 includes a processing unit, a read-only storage (ROS) for storing the operational code, a random-access memory (RAM) that operates as a cache memory, a programmable chip select for generating a memory chip select (CS1), a LAN controller chip select (CS2), a serial communication controller chip select (CS3), and a control logic chip select (CS4).

Memory 96 transfers the LAN frame between the LAN controller 84 and the serial communication controller. Such a memory is divided into at least two independent areas: a LAN-to-switch area organized in a first plurality of 2K bytes buffers and a switch-to-LAN area organized in a second plurality of 2K bytes buffers.

General bus 72 includes a data bus, an address bus and control signals such as read, write, chip selects, interrupts, bus requests and bus acknowledges, but the width of both data bus and address bus is not critical.

Following a machine power-on or a reset, microcontroller 94 initializes the three main components of the LAN adapter: memory 96, LAN controller 84, and SCC 88, as illustrated in FIG. 5. The initialization of LAN controller 84 includes setting up the receive DMA of the controller with the base address of the LAN-to-switch buffer no. 1 in memory 96. The initialization of SCC 88 includes setting up the receive direct memory access (DMA) of the SCC with the base address of the switch-to-LAN buffer no. 1 in memory 96.

Assuming that a frame is received from the network on the receive line TD of connector 60, this frame is converted into TTL logic by analog circuitry 82 and transferred to LAN controller 84. While the incoming bits are stored in an internal receive first-in-first-out (FIFO) queue, the receive DMA of LAN controller 84 requests the use of general bus 72 to arbiter 78 by activating the HOLD signal. When the general bus 72 is free, arbiter 78 activates the HLDA signal. The receive DMA of LAN controller 84 transfers the bytes of the frame from the FIFO of the LAN controller and they are stored into the LAN-to-switch buffer no. 1 in memory 96. When the entire frame is stored in the memory, LAN controller 84 activates its interrupt signal INT1.

When receiving the interrupt signal INT1, microcontroller 94 stops its current task to execute a LAN interrupt routine by reading the interrupt register of LAN controller 84 to determine the cause of the interruption, initializes the receive DMA of LAN controller 84 with the base address of the LAN-to-switch buffer no. 2 in memory 76 (At this time a new frame coming from the network can be received), reads the frame byte count and the destination address, and jumps to a switch interface routine.

When running the switch interface routine, microcontroller 94 determines the address of the destination LAN adapter using routing tables (it can be a unique address, a multicast address or a broadcast address), determines the connection time by dividing the frame count by fifty-three, stores both the destination address and the connection time in a parallel-to-series register located in control logic 90.

Figure 6:
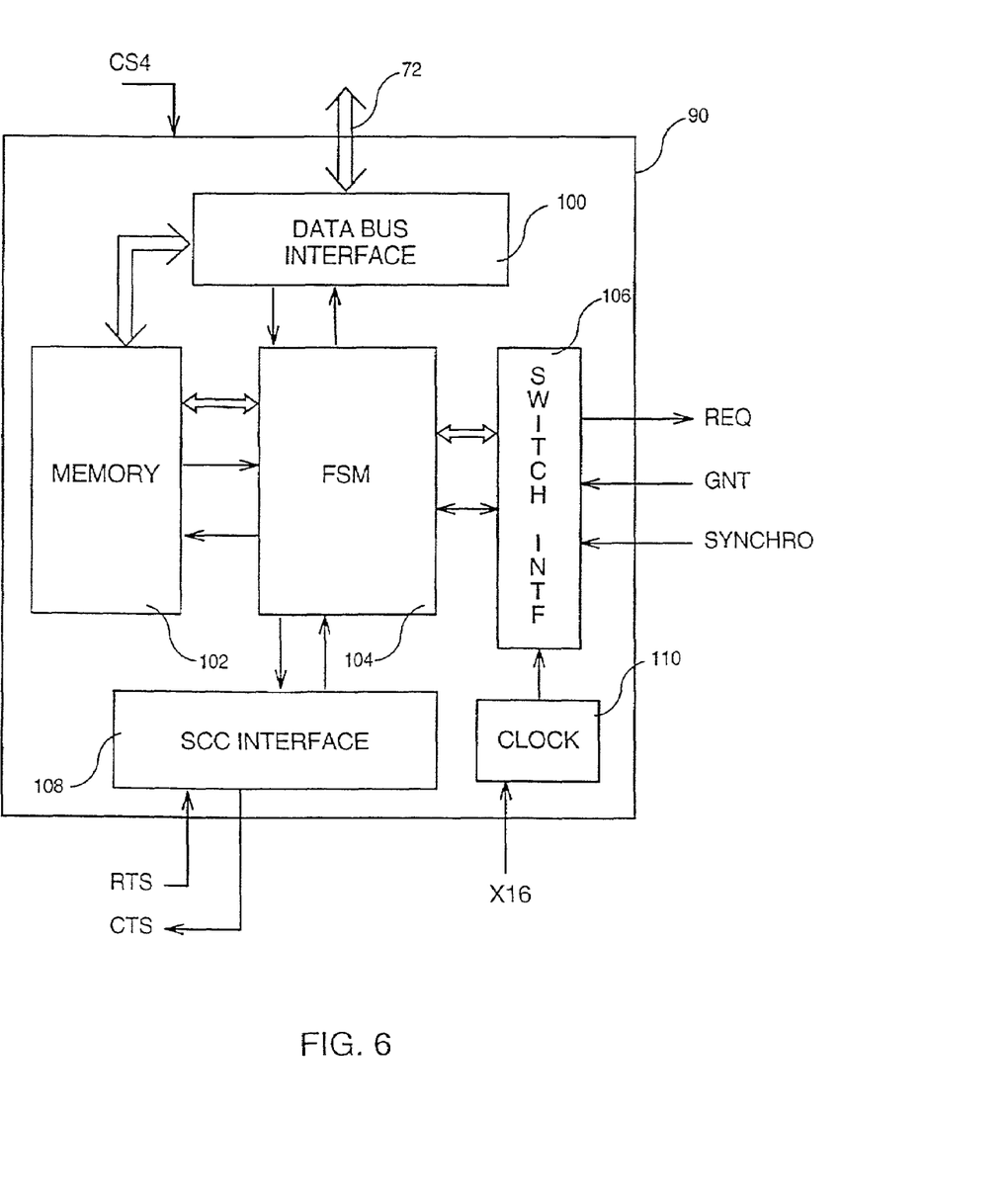
FIG. 6 depicts a block diagram of the control logic of the ATM crossbar switch according to a preferred embodiment of the present invention.

Referring to FIG. 6, there are depicted the components controlled by control logic 90. When receiving the CS4 signal from the microcontroller 94, control logic 90 stores into a memory 102 by the intermediary of a data bus interface 100 the destination address and the connection time which are received from microcontroller 94 via bus 72. A signal CS4 is transmitted from microcontroller 94 to control logic 90 each time microcontroller 94 is interrupted by the LAN controller 84 when a data frame is received. Then, a finite state machine (FSM) 104, which controls all the operations of control logic 90, starts sending a REQ signal containing the destination address and the connection time through a switch interface control unit 106. Note that FSM 104 is timed by a clock control unit 110, which also provides the clock of the REQ signal transmitted by switch interface control unit 106 from the data clock multiplied by sixteen.

When receiving a GNT signal, the switch interface control block 106 is activated for storing into the memory 102 the GNT contents and interrupting the finite state machine 104. The latter compares the destination address and the connection time of all requests stored in the memory 102 with the GNT contents. If the comparison is positive, FSM 104 programs the transmit DMA of the SCC 88 through the SCC interface 108 by sending to SCC 88 the destination address and connection time through data bus 72 utilizing data bus interface 100. FSM 104 also activates the Clear-to-send line (CTS) to the SCC 88 through the SCC interface 108. The transmit DMA transfers the bytes from the LAN-to-switch buffer no. 1 of memory 96 into the switch card according to the received destination address and connection time of the GNT signal. These bytes are sent in an HDLC format to guarantee the data integrity through the backplane. When the LAN-to-switch no. 1 is empty, SCC 88 activates its interrupt line INT2. It must be noted that the HDLC format uses a flag when the end of the frame is reached even if the last slot is less then fifty-three bytes, and does not require the use of padding bits to complete a fifty-three byte cells as in the ATM procedure.

Figure 7:
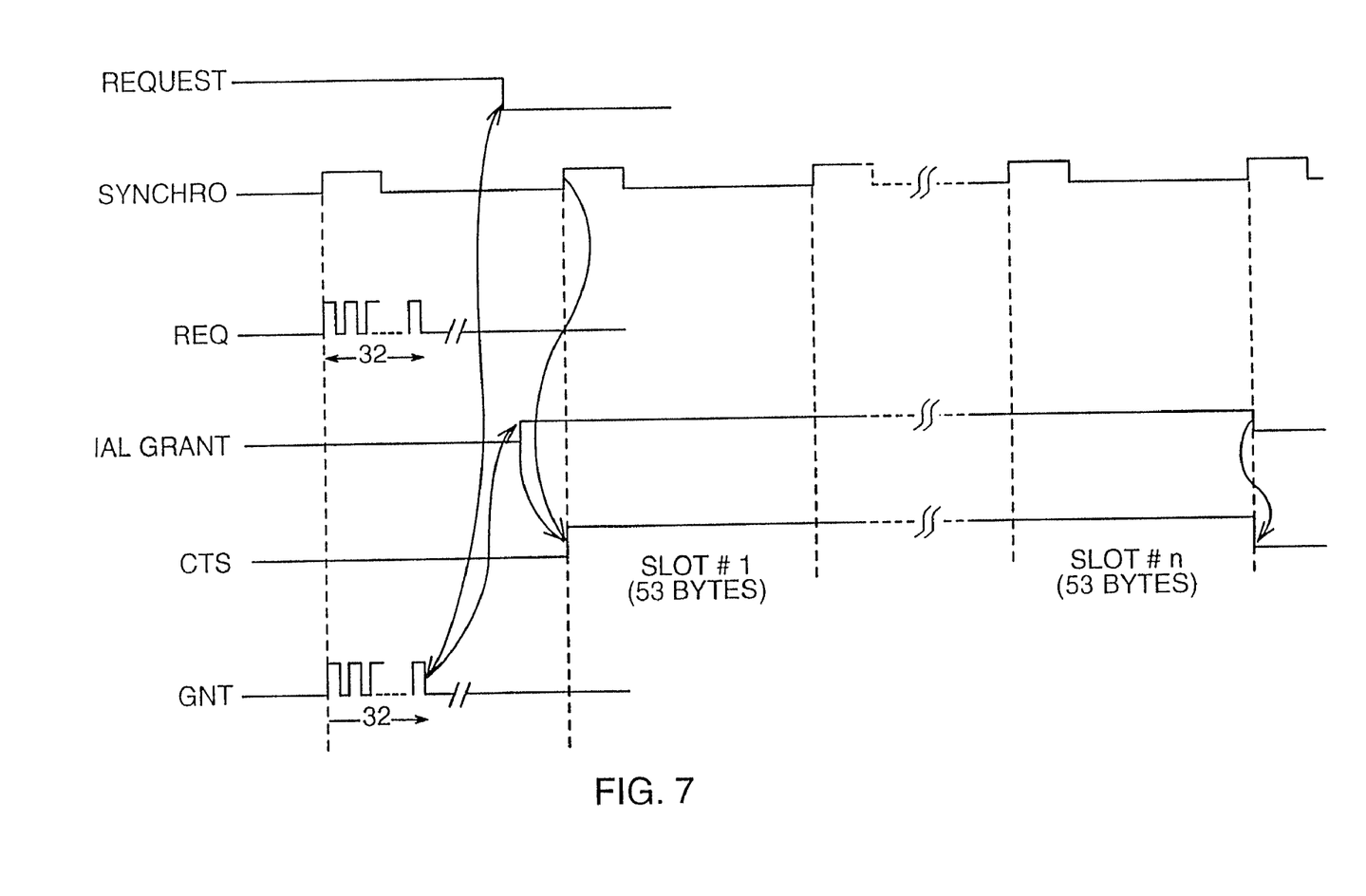
FIG. 7 illustrates a diagram depicting the main signals exchanged in a LAN adapter according to a preferred embodiment of the present invention.

Control logic 90 synchronizes the timing of the different actions described above, such as outputting the destination address and the connection time on the request signal, receiving the grant signal and setting up the CTS signal, with the timing of the switch card, as illustrated in FIG. 7.

When receiving the interrupt signal INT2 from SCC 88, microcontroller 94 s stops its current task to execute a SCC interrupt routine by reading the interrupt register of SCC 88 to determine the cause of the interruption and releasing the LAN-to-switch buffer no. 1 in memory 96.

When SCC 88 detects the reception of a frame from the switch card, SCC 88 requests the use of the general bus 72 to arbiter 78 by activating its HOLD line and stores the incoming bits in an internal receive FIFO. When the general bus is free, arbiter 58 activates a HLDA line to SCC 88. From now on, the receive DMA of SCC 88 transfers the bytes of the frame from the FIFO of SCC 88 into the switch-to-LAN buffer no. 1 in memory 96. When the entire frame is stored in memory 96, SCC 88 activates its interrupt line INT2.

When receiving the interrupt signal INT2, microcontroller 74 stops its current task to execute the SCC interrupt routine by reading the interrupt register of SCC 88 to determine the cause of the interruption, initializing the receive DMA of SCC 88 with the base address of the switch-to-LAN buffer no. 2 of memory 96 (at this time a new frame coming from the switch card can be received), initializing the transmit DMA of LAN controller 84 with the base address of the switch-to-LAN buffer no. 1 of memory 96 and the byte count, and starting the transmit DMA of LAN controller 84.

Then, the transmit DMA of SCC 88 requests the use of general bus 72 to arbiter 78 by activating the HOLD line of SCC 88. When the general bus is free, arbiter 78 activates the HLDA line to SCC 88. The transmit DMA of SCC 88 transfers the bytes of the frame from switch-to-LAN buffer no.1 of memory 96 to the LAN. These bytes are transmitted serially through analog circuitry 82 onto the transmit line TD of connector 80. When the entire frame is sent out, LAN controller 84 activates the interrupt line INT1 to microcontroller 94.

When receiving the interrupt signal INT1, microcontroller 94 stops its current task to execute the LAN interrupt routine by performing the actions of reading the interrupt register of LAN Controller 84 to determine the cause of the interruption and releasing the switch-to-LAN buffer no. 1.

While the invention has been particularly shown and described with reference to a preferred embodiment, it will also be understood by those skilled in the art that various changes in form and detail may be made therein without departing from the spirit and scope of the invention.

What is claimed is:

1. A data transmission system comprising:
    a hub including a plurality of adapters including at least a requesting adapter and at least a destination adapter, wherein each of said plurality of adapters further includes:
        a clock multiplier for multiplying by sixteen a data clock of the system and providing control logic with timing pulses used to transmit thirty-two bits of a request signal;
    a plurality of data processing systems, including at least a requesting data processing system and at least a destination data processing system, coupled to said hub via said requesting adapter and said destination adapter; and
    a crossbar switch coupling said plurality of adapters, wherein said requesting data processing system transmits at least a data frame to said destination adapter, said requesting adapter converts said data frame into concatenated slots of an identical size and transmits said concatenated slots of said identical size through said crossbar switch.

2. The data transmission system according to claim 1, wherein said plurality of data processing systems is a plurality of local area networks (LANs), including at least a requesting LAN and at least a destination LAN.

3. The data transmission system according to claim 1, wherein said plurality of adapters is a plurality of local area network (LAN) adapters, including at least a requesting LAN adapter and at least a destination LAN adapter.

4. The data transmission system according to claim 1, wherein said data frame is a LAN data frame.

5. The data transmission system according to claim 1, wherein said crossbar switch is an asynchronous transfer mode (ATM) crossbar switch.

6. The data transmission system according the claim 1, said plurality of LAN adapter further includes:
    a control logic for transmitting a plurality of request signals (REQ) to said crossbar switch, each of said plurality of requests signals associated with said destination adapter.

7. The data transmission system according to claim 1, said crossbar switch further comprises:
    a scheduler for transmitting a plurality of grant signals (GNT) associated with a plurality of request signals enabling said requesting data processing system to transmit at least said data frame to said destination data processing system, said plurality of grant signals being transmitted in an order depending upon a predetermined algorithm controlling said scheduler regardless the order said plurality of requests are transmitted by said requesting adapter.

8. The data transmission system according to claim 1, wherein said requesting adapter further comprises:
    a serial communication controller further including:
        a means for converting said data frame received from said requesting data processing system into serial data before transmitting said serial data to said crossbar switch; and
        a means for converting serial data before transmitting said data frame to said destination data processing system.

9. The data transmission system according to claim 8, wherein said serial data is implemented as concatenated slots of a cell size in a high-level data link control (HDLC) format.

10. The data transmission system according to claim 8, wherein a plurality of request signals (REQ) are serial encoded signals of thirty-two bits.

11. The data transmission system according to claim 10, wherein a plurality of grant signals (GNT) are serially encoded signals of thirty-two bits that are sampled by a signal at the frequency of the data clock of the system multiplied by sixteen.

12. The data transmission system according to claim 11, wherein said plurality of request (REQ) signals and said plurality of grant (GNT) signals both include a first pair of data bytes including sixteen bits defining a destination address of said data frame to be transmitted and a second pair of data bytes including sixteen bits carrying the connection time defined by the number of slots to be transmitted.

13. The data transmission system according to claim 12, wherein said first data byte defining said destination address includes one bit for each of said plurality of adapters, a bit being set when said destination address corresponds to said destination adapter, which enables a point-to-point connection, a multicast connection or a broadcast connection.

14. The data transmission system according to claim 8, wherein said serial communication controller further comprises:
   a means for generating a high-level data link control (HDLC) frame, in response receiving said data frame from said requesting data processing system coupled to said requesting adapter before transmitting said HDLC frames to said crossbar switch.

15. The data transmission system according to claim 14, wherein said means for generating in said serial communication controller further includes:
   a means for generating a high-level data link control (HDLC) flag to start said HDLC frame;
   a means for serializing a set of incoming parallel data bytes;
   a means for computing a frame check sequence (FCS) after said set of incoming parallel data bytes; and
   a means for generating another HDLC flag to end said HDLC frame.

16. The data transmission system according to claim 15, wherein said serial communication controller further comprises:
   a means for converting said high-level data link control (HDLC) frames received from said crossbar switch into a plurality of data frames to be transmitted to said destination data processing system.

17. The data transmission system according to claim 16, wherein said means for converting in said serial communication controller further includes:
   a means for detecting a starting high-level data link control (HDLC) frame in a incoming HDLC frame;
   a means for checking the data integrity of said HDLC frame by computing a frame check sequence (FCS); and
   a means for deserializing the data bits of said HDLC frame to provide a set of data bytes of said data frame.

18. The data transmission system according to claim 17, wherein each of said plurality of adapters further comprises:
   a memory divided into at least two independent areas, a first data processing system-to-switch area organized in a first plurality of buffers for storing at least said data frame received from a data processing system coupled to said adapter and to be transmitted to another data processing system, and a second switch-to-data processing system area organized in a second plurality of buffers for storing at least said data frame received from another data processing system and to be transmitted to said data processing system coupled to said adapter.

19. The data transmission system according to claim 18, wherein each of said plurality of adapters further comprises:
   a controller, for converting a serial data frame to a parallel data frame, or for converting a parallel data frame to a serial data frame.

20. The data transmission system according to claim 19, wherein said controller comprises:
   a means for synchronizing a clock during a set of preamble bytes when receiving said data frame;
   a means for detecting an incoming data frame through a delimiter byte of said frame;
   a means for checking data integrity of said data frame by computing a frame check sequence (FCS) bytes;
   a means for removing a set of protocol information of said data frame; and
   a means for deserializing the remaining incoming bits of said data frame to provide parallel data bytes.

21. The data transmission system according to claim 19, wherein said controller further includes:
   a means for serializing incoming data bytes received from said serial communication controller;
   a means for generating protocol information bytes to be included in said data frame; and
   a means for computing said frame check sequence (FCS) of said data frame before transmitting said data frame to a data processing system connected to an adapter.

22. The data transmission system according to claim 21, further comprises:
   an arbiter for taking care of the contention between requests sent from said controller and requests sent from said serial communication controller.

23. The data transmission system according to claim 22, wherein said scheduler further comprises:
   an algorithm means for determining which request is to be granted each time a new request (REQ) signal is received, said new REQ signal to be granted utilized as a grant (GNT) signal being transmitted to said requesting LAN adapter; and
   a control logic means, further including:
      a memory for storing said request (REQ) signal received from said requesting adapter.

* * * * *